(12) United States Patent
Pauquet et al.

(10) Patent No.: US 10,198,583 B2
(45) Date of Patent: Feb. 5, 2019

(54) DATA FIELD MAPPING AND DATA ANONYMIZATION

(71) Applicant: SAP SE, Walldorf (DE)

(72) Inventors: Kerstin Pauquet, Galway (IE); Jesper Magnusson, Quebec (CA); Aurelien Leblond, Galway (IE)

(73) Assignee: SAP SE, Walldorf (DE)

( * ) Notice: Subject to any disclaimer, the term of this patent is extended or adjusted under 35 U.S.C. 154(b) by 869 days.

(21) Appl. No.: 14/089,754

(22) Filed: Nov. 26, 2013

(65) Prior Publication Data

US 2015/0150139 A1 May 28, 2015

(51) Int. Cl.
G06F 21/60 (2013.01)
G06F 17/30 (2006.01)
G06F 21/62 (2013.01)

(52) U.S. Cl.
CPC ........ *G06F 21/60* (2013.01); *G06F 17/30312* (2013.01); *G06F 17/30613* (2013.01); *G06F 21/6254* (2013.01)

(58) Field of Classification Search
CPC ........... G06F 17/30613; G06F 17/2705; G06F 21/60; G06F 21/6254; G06F 17/30312
USPC .................................................. 707/514, 755
See application file for complete search history.

(56) References Cited

U.S. PATENT DOCUMENTS

| | | | | |
|---|---|---|---|---|
| 6,763,499 B1* | 7/2004 | Friedman | ............ | G06F 17/2247 715/240 |
| 7,860,872 B2* | 12/2010 | Serjeantson | ........ | G06F 17/2705 704/9 |
| 9,110,852 B1* | 8/2015 | Lerman | .................... | G06F 17/15 |
| 2004/0123277 A1* | 6/2004 | Schrader | ............. | G06F 17/2247 717/143 |
| 2006/0106837 A1* | 5/2006 | Choi | .................... | G06F 17/2247 |
| 2007/0033089 A1* | 2/2007 | Dharmarajan | .... | G06F 17/30241 705/7.29 |
| 2008/0170748 A1* | 7/2008 | Albertson | ................ | G06F 3/017 382/103 |
| 2008/0209572 A1* | 8/2008 | Kano | .................. | G06F 17/2205 726/28 |
| 2009/0048977 A1* | 2/2009 | Aggarwal | ......... | G06F 17/30867 705/50 |
| 2010/0205541 A1* | 8/2010 | Rapaport | ............... | G06Q 10/10 715/753 |
| 2013/0041912 A1* | 2/2013 | Arora | ................ | G06F 17/30289 707/769 |
| 2013/0159836 A1* | 6/2013 | Ferraro | .................. | G06Q 10/00 715/234 |
| 2013/0167192 A1* | 6/2013 | Hickman | ............ | G06F 21/6245 726/1 |

(Continued)

*Primary Examiner* — Hosain T Alam
*Assistant Examiner* — Saba Ahmed
(74) *Attorney, Agent, or Firm* — Buckley, Maschoff & Talwalkar LLC

(57) ABSTRACT

To establish a link between data fields related by similar data or similar information, a data management application parses data fields of data structures residing in a data store. The attributes and attribute values corresponding to the data fields are determined. The attributes and attribute values are compared and related data fields are determined. A parent data field from the related data fields is determined. A link is established between the parent data field and the data fields from the related data fields.

12 Claims, 9 Drawing Sheets

(56) References Cited

U.S. PATENT DOCUMENTS

2013/0282679 A1* 10/2013 Khin ................... G06F 21/6254
707/698
2015/0193210 A1* 7/2015 Rivas ........................ G06F 8/40
717/136

* cited by examiner

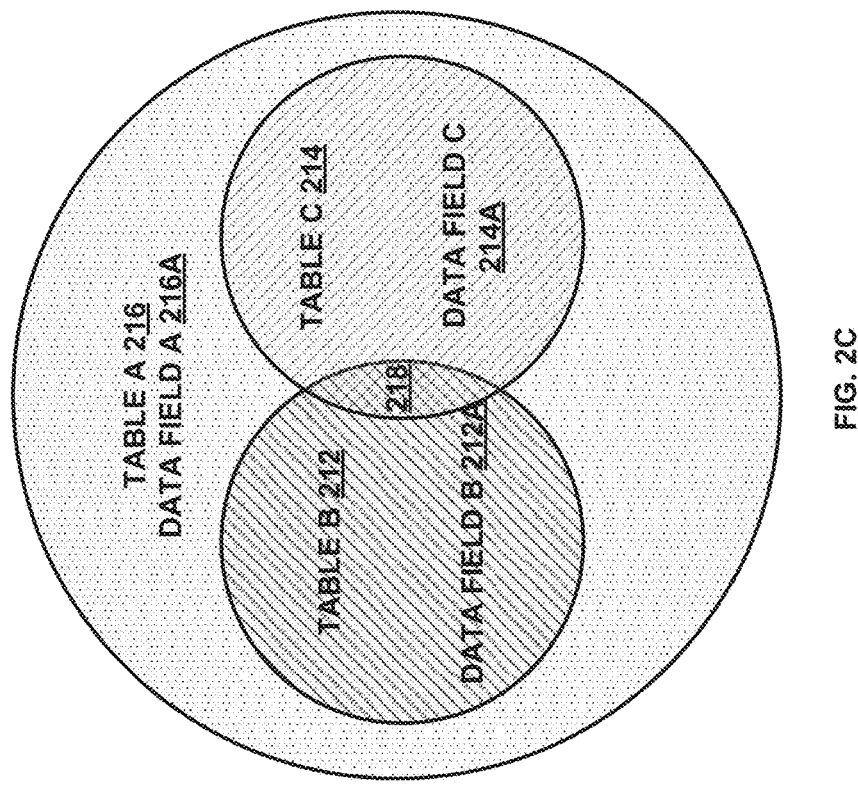
FIG. 2C
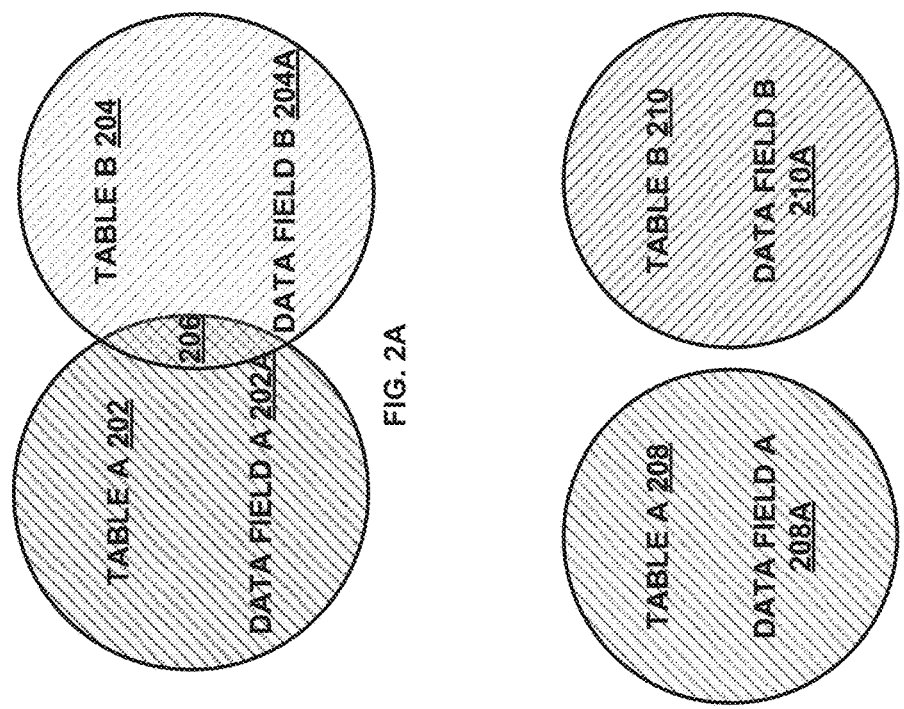
FIG. 2A
FIG. 2B

FIG. 6A

USER INTERFACE 702

TABLE NAME: [DBA].[OITM] 704

| DATA FIELD | IGNORE | PRIMARY KEY | DATA TYPE | SIZE | NULLABLE |
|---|---|---|---|---|---|
| ITEM CODE | ☐ | TRUE | NVARCHAR | 20 | FALSE |
| ITEM NAME | ☐ | FALSE | NVARCHAR | 100 | TRUE |
| FRGN NAME | ☐ | FALSE | NVARCHAR | 100 | TRUE |
| VAT GROUP SA | ☑ | FALSE | NVARCHAR | 8 | TRUE |
| CODE BARS | ☐ | FALSE | NVARCHAR | 16 | TRUE |
| INCOME ACCT | ☑ | FALSE | NVARCHAR | 15 | TRUE |
| EXMPT INCOM | ☑ | FALSE | NVARCHAR | 15 | TRUE |
| DFLT WH | ☐ | FALSE | NVARCHAR | 8 | TRUE |
| CARD CODE | ☐ | FALSE | NVARCHAR | 15 | TRUE |

706  708  710  712  714  716

ANONYMIZE 718

FIG. 7

DATA FIELD MAPPING AND DATA ANONYMIZATION

BACKGROUND

An enterprise may store business data in various tables residing in a database. For instance, the tables residing in the database include business data related to development, quality assurance, sales, support, of services and products offered by the enterprise; data related to employees, customers, and partners. Some of the enterprise business data stored in the database, e.g., the data related to employees, customers, and the like, may be confidential.

Storing business data requires maintenance of the database where the data is stored. Database maintenance may include tasks of resolving anomalies in database functionalities. The enterprise may use a third party vendor for database maintenance. When needed, the enterprise may provide access to confidential information for the third party vendor by masking or encrypting such data. Masking confidential information may be challenging as data may be stored in various tables in the database. Typically the masking of confidential information is accomplished using database queries, for example, blanking queries. However, executing blanking queries on multiple tables is arduous and inconvenient. Verifying whether the confidential information distributed on multiple tables is masked, can be a challenging task, too.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 2A is a block diagram for determining a relation between data fields of tables residing in a data store, according to an embodiment.

FIG. 2B is a block diagram for determining a relation between data fields of tables residing in a data store, according to an embodiment.

FIG. 2C is a block diagram for determining a relation between the data fields of the tables residing in a data store, according to an embodiment.

FIG. 6A is a block diagram illustrating a user interface for rendering business partner data, according to an embodiment.

FIG. 7 is a block diagram illustrating a user interface for rendering related data fields, according to an embodiment.

DETAILED DESCRIPTION

Figure 1:
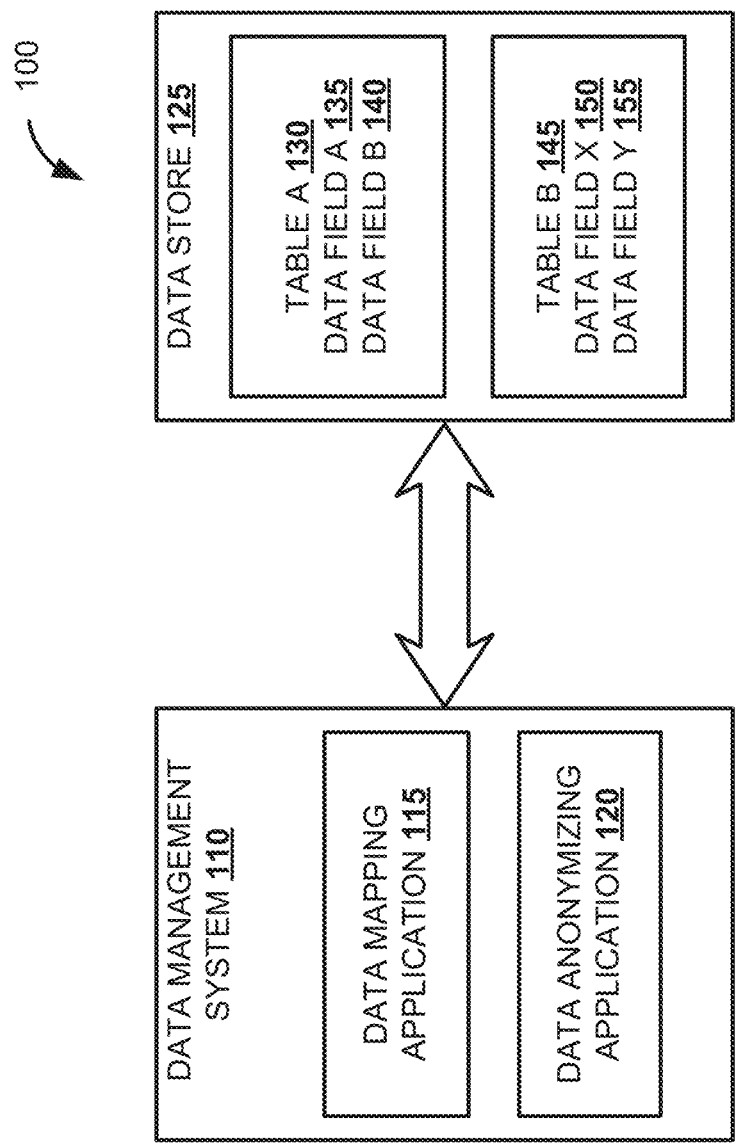
FIG. 1 is a block diagram illustrating a data management system for establishing a link between related data fields, according to an embodiment.

Embodiments of techniques for data field mapping and data anonymization are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The volume of business data associated with an enterprise may witness an exponential surge as a function of time. Such business data may be stored in multiple data structures, and the data structures may reside in multiple data stores. The business data may be centrally accessed over a network by various systems in the enterprise. The systems in the enterprise may include customized software applications that are communicatively coupled to the data stores and support operations depending on the business needs. The systems may be configured to execute operations including analyzing, processing, modifying, updating, and deleting the business data. Further, the business data may reside in the data structures, in forms of tables, flat files, etc. The business data in the tables may include information related to business processes of the enterprise, like financial information resulting from sales of products and services, human resource data, data related to customers and partners.

Part of the business data, for example, business data related to human resources, partners, customers, etc. may include personal information. The personal information may include name, address, occupation, contact information (e.g., address, e-mail, telephone), ethnicity, personal preferences, political and philosophical views, religious beliefs, memberships and affiliations; factual information, such as, annual income, taxes, and social security number. Such business data may be stored in multiple tables in the data store, classified as confidential and hence may need to be protected.

The business data stored in the tables may be arranged in rows and columns. The columns may represent the attributes of the business data and the rows may represent the attribute values of the business data. A data field may correspond to a row or a column, or a cell, respectively, representing attribute or attribute value. The business data, e.g., corresponding to the customers, human resources, partners, etc., may include similar data or similar information stored in multiple tables. The data fields storing similar data may represent related field data. In an embodiment, although similar information is stored in the data fields of multiple tables, the fields may not be linked.

FIG. 1 is a block diagram illustrating a data management system for establishing a link between data fields containing similar information, according to an embodiment. In an embodiment, block diagram 100 includes data management system 110 communicatively coupled with data store 125. Data store 125 includes business data resulting from various business processes in an enterprise and stored in the data fields. For example, the business data corresponds to financial information resulting from sales of products and services, human resource data, and data related to customers and partners stored in data fields A 135, B 140, X 150 and Y 155 in table A 130 and table B 145. The data fields A 135, B 140, X 150 and Y 155 may be arranged in rows and columns in the table A 130 and table B 145, respectively. The business data may correspond to similar information or similar data and may be associated with attributes and attribute values in tables 130, 145 in data store 125.

In an embodiment, data management system 110 includes applications, such as, data mapping application 115 and data anonymizing application 120. Data mapping application 115 may be configured to execute a data mapping logic that performs operations, like, parsing the data fields A 135, B 140, X 150 and Y 155 residing in the tables A 130 and B 140, respectively, determining business data in data fields A 135, B 140, X 150 and Y 155, determining data fields storing similar or related information, and establishing a link between thus related data fields. Data mapping application 115 may be configured to generate a schema of data store 125. The schema corresponds to a graphical structure of data store 125 including established relations and links between data fields related by the stored information.

In an embodiment, data anonymizing application 120 may be configured to execute a data anonymizing logic. The data anonymizing logic describes the manner in which business data is anonymized. For instance, the business data: may be encrypted using data encryption algorithms; masked by shuffling characters, shifting characters, substituting characters, etc.; camouflaged by applying mathematical algorithms, for example, number and date variance; blanked by including null values or deletion of data, etc. Data anonymizing application 120 may be integrated to work in conjunction with data mapping application 115. Such integration enables an end user to optionally select the related data fields to anonymize business data residing therein. An end user may refer to any individual using data anonymizing application 120.

In an embodiment, related data fields represent data fields existing in various tables, which store similar information. For instance, a group of data fields may represent a column, and the column may include an attribute NAME. Such columns with the attribute NAME may be present in multiple tables. However, such columns in different tables need not be linked.

In an embodiment, such columns are determined as related data fields and a link is established between the related data fields. The related data fields may be rendered on a user interface as a list of the related fields (from various data structures) along with their relationships. The business data corresponding in the related data fields may be anonymized by selecting the one or more attributes associated with the related fields and executing the anonymizing logic.

In an embodiment, to establish a link between related data fields, a plurality of data fields associated with a plurality of data structures residing in a data store are parsed. Attributes and attribute values corresponding to the plurality of data fields are determined. The attributes and attribute values corresponding to the data fields are compared to determine related data fields. Comparing includes comparing the attribute and the attribute value of one data field in one data structure with another data field in the same and/or another data structure. Upon determining the related data fields, a parent data field from the related data fields is determined. In an embodiment, a parent data field may represent a primary data field. The remaining related data fields may be referred to as child data fields. A link is established between the parent data field and the child data fields.

FIG. 2A is a block diagram for determining a relation between data fields of tables residing in a data store, according to an embodiment. As exemplarily illustrated, FIG. 2A shows table A 202 including data field A 202A, and table B 204 including data field B 204A. Data fields A 202A and B 204A include attribute values of the business data. For example, 25% of the attribute values corresponding to data field A 202A are overlapping data field B 204A, and 30% of the attribute values corresponding to data field B 204A are overlapping with data field A 202A. A relation between data fields A 202A and B 204A is determined. In an embodiment, if an overlap region 206 of the attribute values in data fields A 202A and B 204A is insufficient to determine parent data field, the data fields A 202A and B 204A may not be linked.

FIG. 2B is a block diagram for determining a relation between data fields of tables residing in a data store, according to an embodiment. As exemplarily illustrated, FIG. 2B shows table A 208 including data field A 208A, and table B 210 including data field B 210A. Data fields A 208A and B 210A include attribute values of business data. Attribute values corresponding to data fields A 208A and B 210A do not overlap. Data mapping module (e.g., 516, of FIG. 5) may determine that there is no relation between the data fields A 208A and B 210A. Hence, the data mapping module 516 does not link data fields A 208A and B 210A.

FIG. 2C is a block diagram for determining a relation between the data fields of the tables residing in a data store, according to an embodiment. As exemplarily illustrated, FIG. 2C shows table A 216 including data field A 216A; table B 212 including data field B 212A; and table C 214 including data field C 214A. Data fields A 216A, B 212A and C 214A include attribute values of business data. In an embodiment, all or a certain percentage of the attribute values may overlap. For example, consider that 15% of the attribute values corresponding to data field B 212A are overlapping with data field C 214A; 25% of the attribute values corresponding to data field C 214A are overlapping with data field B 212A; 100% of the values of data field B 212A and C 214A are overlapping with data field A 216A Data mapping module (e.g., data module 516 of FIG. 5), determines an existence of a relation between data fields A 216A, B 212A and C 214A. The data mapping module 516 determines that data field A is a parent data field and links data fields A 216A, B 212A and C 214A.

Following is an exemplary illustration of establishing a link between related data fields, according to an embodiment. Table 1, residing in a data store, exemplarily illustrates personal data associated with employees.

TABLE 1

| NAME | DATE OF BIRTH | CITY OF PERMANENT RESIDENCE | STATE |
| --- | --- | --- | --- |
| JOHN SMITH | Sep. 10, 1980 | ALBANY | NY |
| JIM GRAY | Jun. 3, 1965 | TRACY | CA |
| STEVE GATES | Jul. 5, 1956 | ORANGE COUNTY | CA |

The columns of Table 1 corresponds to attributes of personal data including 'Name', 'Date of Birth', 'City of Permanent Residence', 'State.' The rows of Table 1 correspond to attribute values of the personal data. For instance, row 1 corresponds to the attribute values 'John Smith', '09/10/1980', 'Albany', 'NY', and so on.

Table 2, residing in the data store, exemplarily illustrates employment related data associated with the employees.

TABLE 2

| NAME | DESIGNATION | LINE OF BUSINESS | STATE OF EMPLOYMENT |
|---|---|---|---|
| JOHN SMITH | SENIOR ENGINEER | CLOUD | NY |
| MERRISA MERMAID | ENGINEER | MOBILE | CA |
| JASON GORDEN | MANAGER | ANALYTICS | CA |

The columns of Table 2 corresponds to attributes of employment related data including 'Name', 'Designation', 'Line of Business', 'State of employment.' The rows of Table 2 correspond to attribute values of the personal data. For instance, row 1 corresponds to the attribute values 'John Smith', 'Senior Engineer, 'Cloud', 'NY', and so on.

Table 3, residing in the data store, exemplarily illustrates data related to remuneration associated with employees.

TABLE 3

| NAME | REMUNERATION (PER ANNUM IN USD) | STATE TAX (PER ANNUM IN USD) | STATE |
|---|---|---|---|
| JOHN SMITH | 120,000 | 40,000 | NY |
| MERRISA MERMAID | 150,000 | 50,000 | CA |
| STEVE GATES | 90,000 | 30,000 | CA |

The columns of Table 3 corresponds to attributes of remuneration data including 'Name', 'Remuneration (per annum in USD)', 'State Tax (per annum in USD)', and 'State.' The rows of Table 3 correspond to attribute values of the remuneration data. For instance, row 1 corresponds to the attribute values 'John Smith', '120,000', '40,000', 'NY', and so on.

In an embodiment, column 1 of Table 1, Table 2 and Table 3 correspond to identical attribute, for example, NAME, and include identical attribute values. However, such columns may not be linked. The attributes and the attribute values corresponding to Table 1, Table 2 and Table 3 are compared to identify one or more related fields including similar data or similar information. For example, the data fields represented by the attribute 'NAME' in Table 1, Table 2 and Table 3 are determined as related data fields, as they include similar data/information. A parent data field, for example, column corresponding to Table 1 with attribute 'NAME' is determined as the parent data field from the related data field. The columns in Table 2 and Table 3 with attribute 'NAME' are determined as child data fields. Based on such a determination, the data fields corresponding to columns with attribute 'NAME' are linked.

Figure 3:
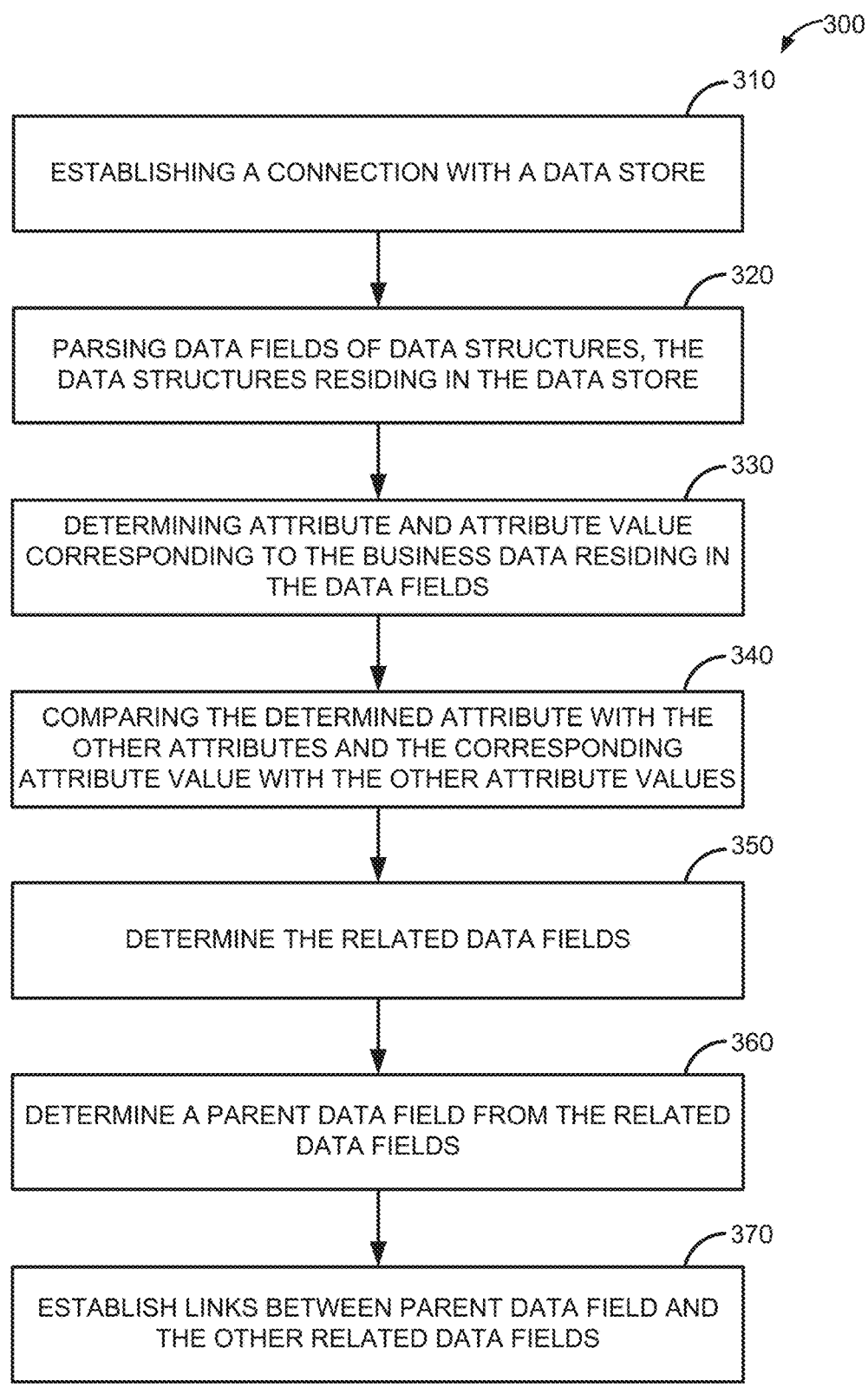
FIG. 3 is a flow diagram illustrating a process for establishing a link between related data fields, according to an embodiment.

FIG. 3 is a flow diagram illustrating process 300 for establishing a link between related data fields, according to an embodiment. Process 300 establishes a link between related data fields, upon execution. At 310, a connection with a data store is established. At 320, data fields corresponding to data structures residing in the data store are parsed. An attribute and a corresponding attribute value are determined from the business data residing in the data fields, at 330. A comparison is performed between the determined attribute and the other attributes in the data fields; and between the corresponding attribute value and the attribute values, at 340. Based on the comparison, related data fields are determined, at 350. From the determined related data fields, a parent data field is determined, at 360. The determination of the parent field is as explained (e.g. description of FIG. 2A, FIG. 2B and FIG. 2C). One or more links are established between the determined parent data field and the one or more related data fields, at 370.

Figure 4:
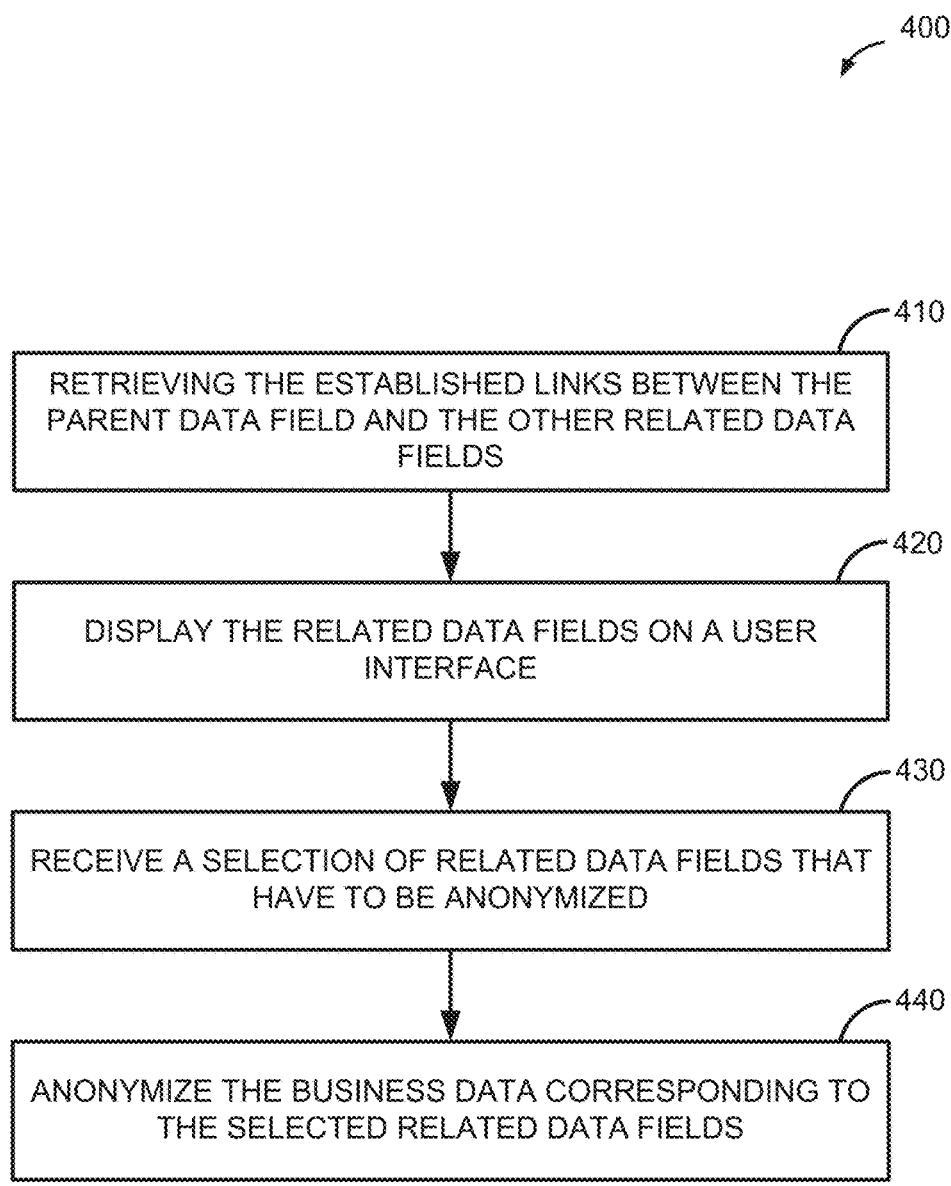
FIG. 4 is a flow diagram illustrating a process for anonymizing data fields, according to an embodiment.

FIG. 4 is a flow diagram illustrating process 400 for anonymizing data fields, according to an embodiment. At 410, links that are established between the parent data field and the related data fields are retrieved. Based on the retrieval, the related data fields are displayed on a user interface, at 420. The user interface that renders the related data fields is configured to receive a selection of the one or more related data fields that may be anonymized, at 430. Upon receiving the selection, a data anonymizing logic is executed to anonymize the business data corresponding to the selected related data fields, at 440. In an embodiment, the data anonymizing logic is executed to anonymize the business data corresponding to the selected related data fields.

Figure 5:
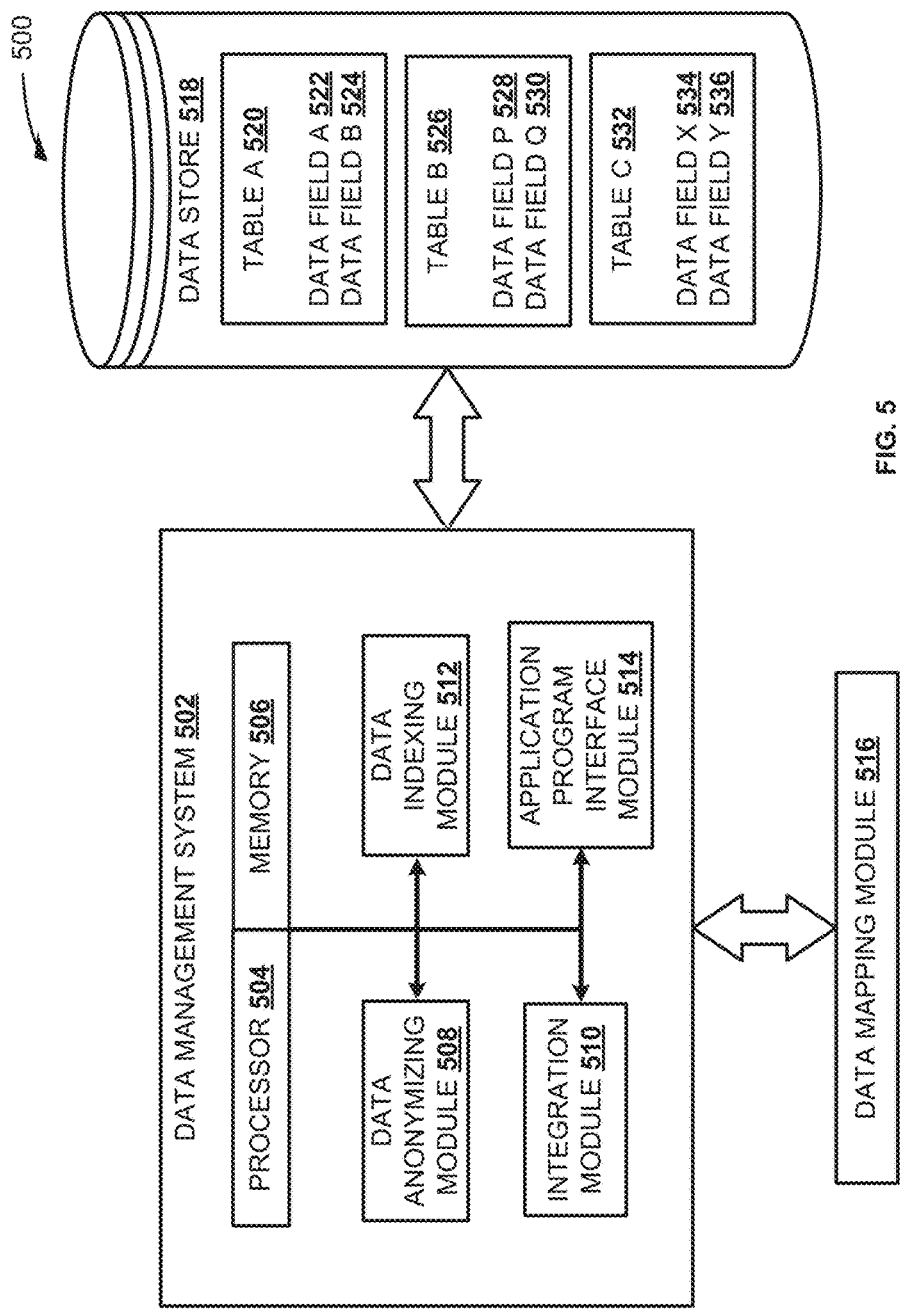
FIG. 5 is a block diagram illustrating a system for establishing a link between related data fields in tables residing in a data store, according to an embodiment.

FIG. 5 is a block diagram illustrating system 500 for establishing a link between related data fields in tables residing in a data store, according to an embodiment. System 500 includes data management system 502, data mapping module 516 and data store 518. Data management system 502 includes data anonymizing module 508, data indexing module 512, integration module 510 and application programming interface (API) module 514. In an embodiment, memory 506 stores one or more instructions that are configured to be executed by processor 504. Data management system 502, data mapping module 516 and data store 518 may be communicatively coupled over a network (not shown).

In an embodiment, data store 518 may include an in-memory database, an operational data store, a conventional database, etc., containing structured and unstructured business data. Business data includes information related to business processes of an enterprise. Business data may reside in data fields A 522, B 524, P 528, Q 530, X 534, and Y 536 included in multiple tables 520, 526 and 532 in data store 518. Data fields A 522, B 524, P 528, Q 530, X 534, and Y 536 may be arranged in rows and columns in tables 520, 526, and 532, respectively. Some business data residing in the data fields A 522, B 524, P 528, Q 530, X 534, and Y 536 may include confidential information and may need to be protected.

In an embodiment, data mapping module 516 may be configured to execute a data mapping logic, on the business data stored in tables 520, 526 and 532 in data store 518. The data mapping logic executes to perform operations, like, parsing data fields A 522, B 524, P 528, Q 530, X 534, and Y 536 in tables 520, 526 and 532, determining business data in data fields A 522, B 524, P 528, Q 530, X 534, and Y 536. The data mapping logic determines attributes and attribute values of the business data, determines related data fields, determines a parent data field in the related data fields, and establishes links between parent data field and the other related data fields.

In an embodiment, the parent data field represents a data field that uniquely identifies a row in another table residing in data store 518. The parent data field may be determined based on a combination of operations, such as, logical comparisons, mathematical computations, string operations, correlating attribute and attribute value corresponding to the business data, and the like. For instance, table A 520 may include data field A 522; table B 526 may include data field P 528; and table C 532 may include data field X 534. Data fields A 522, P 528 and X 534 include attribute values of the business data. Consider an example, where 25% of the attribute values corresponding to data field P 528 are overlapping with data field X 534; 35% of the attribute values corresponding to data field X 534 are overlapping data field P 528; 100% of the values in data field P 528 are overlapping with data field A 522; and 100% of the values in data field X 534 are overlapping with data field A 522. The data mapping module determines a relationship between data fields A 522, P 528 and X 534; determines: that data fields A 522, P 528 and X 534 are related; and data field A 522 is the parent data field and links the related data fields A 522, P 528 and X 534.

In an embodiment, once the related data fields and the parent data field are determined, data mapping module 516 establishes a link between the parent data field and the related data fields. The link between the parent data field and the related data fields is established based on deterministic rules and probability rules. The deterministic rules may use correlation, matching, or comparing techniques to match the attribute and the attribute values corresponding to the parent data field and the related data fields. The probability rules may be based on computing an estimation to determine match and/or a failure to match, between the attributes and the attribute values corresponding to the parent data field and the related data fields. The computed estimation may be assigned weights depending on a percentage match and/or failure to match. Data mapping module 516 may automatically detect changes in business data in response to operations, such as, delete, modify, add, and the like. Data mapping module 516 may be configured to generate a graphical structure of data store 518 including relations and links between data fields A 522, B 524, P 528, Q 530, X 534, and Y 536 of tables 520, 526 and 532 residing in the data store 518. In another embodiment, a combination of deterministic rules and probability rules may be used to establish links between the parent data field and the related data fields.

In an embodiment, data anonymizing module 508 may be configured to execute an anonymizing logic. The anonymizing logic executes a data anonymizing algorithm for anonymizing data. For instance, the business data may be: encrypted using data encryption algorithms; masked by shuffling characters, shifting characters, or substituting characters, etc.; camouflaged by mathematical techniques including number and date variance; blanked by inserting null values. Data anonymizing module 508 may be configured with a set of rules to determine and regulate the execution of anonymizing logic on data fields A 522, B 524, P 528, Q 530, X 534, and Y 536. The set of rules may enforce constraints on data fields A 522, B 524, P 528, Q 530, X 534, and Y 536. For instance, the constraints may include ignoring data fields with numerical values, such as, quantity, unit price, discount amount; ignoring information pertaining to authentication, such as, a username and password; ignoring numerical values computed using certain business logic, formulae, and functions; ignoring an object type that may include information related to a transaction; ignoring a predetermined number of characters, like less than 6 characters. The business data in the data fields that correspond to such constraints may not be anonymized.

In an embodiment, data anonymizing module 508 may be configured with rules to lock data fields A 522, B 524, P 528, Q 530, X 534, and Y 536. For example, the configured rules may prevent operations like modifying, updating, overwriting, of the business data. Execution of some rules may mandatorily anonymize certain data fields by default, or provide an option to select or deselect the related data fields for anonymization. Execution of some rules may ignore business data in all tables corresponding to the selected or deselected data fields. Data anonymizing module 508 preserves the structure and/or format of business data. The structure and/or format of business data may include capital letters, punctuation marks, special characters, and the like. For example, a data field may include a customer name "Paddy O'Malley," and on executing the anonymizing logic on this data field, data anonymizing module 508 may generate "Lnvgr P'Wnrjdi," preserving the structure and/or format of the anonymized data.

In an embodiment, data indexing module 512 generates a unique index for each row in the table. The indexes may improve operational efficacies including retrieval, updating, and modifying. Integration module 510 may be configured to integrate data management system 502 and data mapping module 516. The integration enables data management system 502 to operably work in conjunction with data mapping module 516. The application program interface (API) module 514 may be configured to generate user interfaces (UIs) for data management system 502 and data mapping module 516. The UIs are configured to support operations corresponding to data management system 502 and data mapping module 516. Such operations may include receiving a user input, instantiate modules 508, 510, 512, 514 and 516 based on received user input, display business data based on operations and analysis, and the like.

Figure 6A:
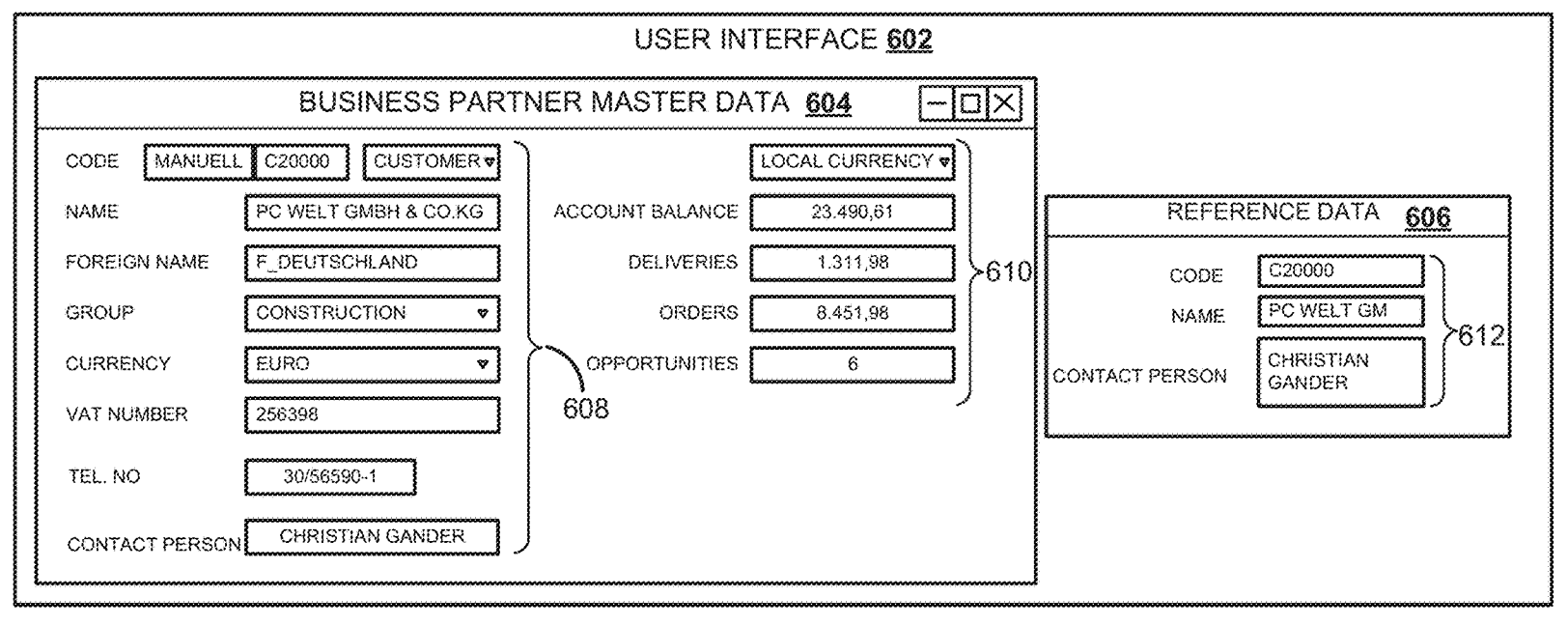

FIG. 6A is a block diagram illustrating a user interface for rendering business partner data, according to an embodiment. FIG. 6A shows user interface 602 rendering business data including business partner master data 604 and a corresponding reference data 606, according to an embodiment. The business partner master data 604 includes information 608 related to "Code", "Name", "Foreign Name", "Group", "Currency", "Value Added Tax (VAT) Number", "Telephone number", "Contact Person", etc. The business partner master data 604 also includes information 610 related to transactions. For example, "Local Currency", "Account Balance". "Deliveries", "Orders", and may also include information related to possible opportunities for prospective orders, etc. The quick reference data 606 includes information 612 corresponding to the business partner data, like "Code", "Name" and "Contact Person" details. In an embodiment, the information 612 may be classified as confidential information.

Figure 6B:
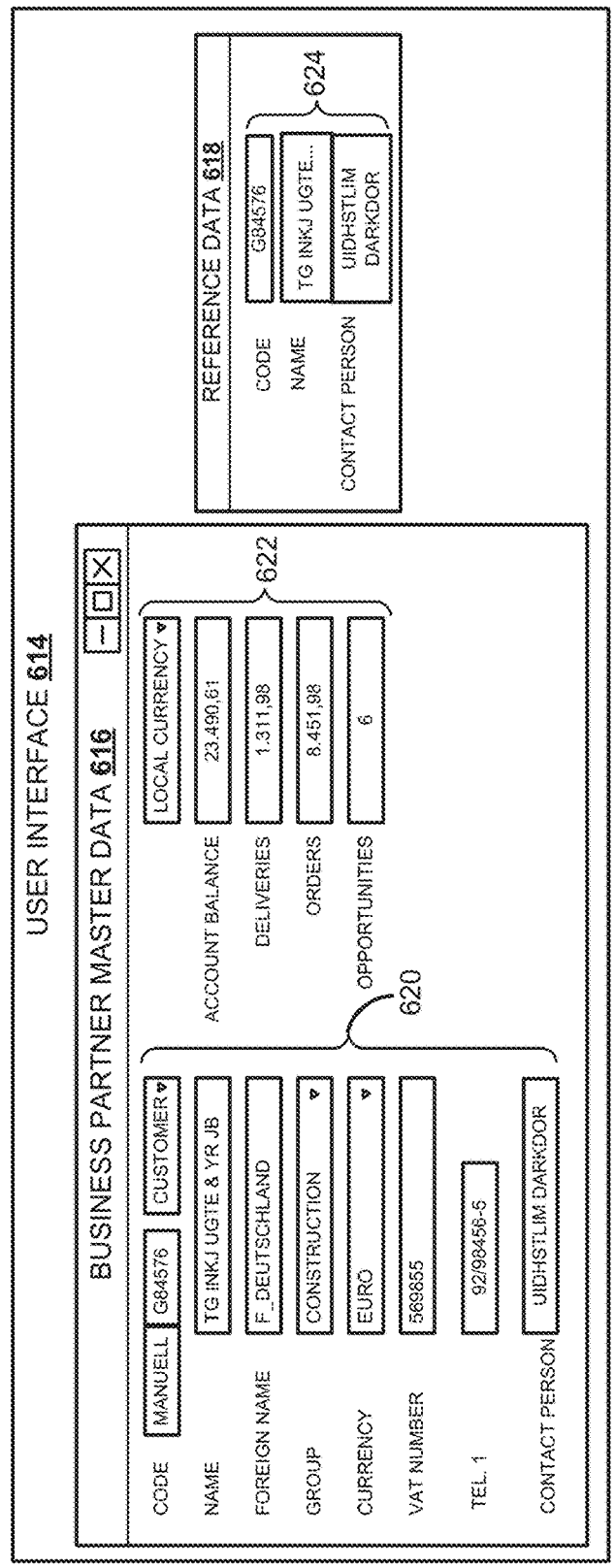
FIG. 6B is a block diagram illustrating a user interface for rendering an anonymized dataset, according to an embodiment.

FIG. 6B is a block diagram illustrating a user interface for rendering an anonymized dataset, according to an embodiment. FIG. 6B shows a user interface 614 rendering business data. For example, business partner master data 616 and quick reference data 618 are displayed in FIG. 6B, according to an embodiment. The business data including information classified as confidential is anonymized. As explained in detailed description of FIG. 5, data anonymizing module 508 determines data fields to be anonymized based on the configured rules and executes the data anonymizing logic on the determined data fields. In FIG. 6B, part of data fields as shown by 624 are anonymized. The data fields shown by 622 are not anonymized. Reference data 618 renders part of the data fields with as shown by 624 includes anonymized business data.

FIG. 7 is a block diagram illustrating a user interface for rendering related data fields, according to an embodiment. In an embodiment, the data rendered on the user interface 702 includes columns: 'Data Field' 706. 'Ignore' 708, 'Primary Key' 710, 'Data Type' 712, 'Size' 714, etc. The information corresponding to 'Data Field' 706 includes related data fields, for example, attributes that are similar and included in one or more tables (e.g. in data store 518 illustrated in FIG. 5). The information corresponding to 'Data Type' 712 indicates the type of data, for example, varchar, numeric, etc., associated with the corresponding attribute. The information related to 'Size' 714 indicates the size in bytes of the corresponding data fields. The information related to 'Nullable' 716 indicates whether the corresponding data fields can include null values. In one embodiment, the data field determined as the parent data field cannot include null values. The information related to 'Primary Key' 710 indicates which of the corresponding data fields is a parent data field. For instance, 'Item Code' in 'Data Field' 706 is determined as the parent data field and the corresponding primary key value is set to 'True.' The values in 'Primary Key' 710 corresponding to all other attributes (of column 706) are set to 'False.'

In an embodiment, the user interface 702 is configured to receive a selection of one or more items of 'Data Field' 706. 'Ignore' 708 includes check box corresponding to each attribute in the data field 706. A selection of the data field is indicated by a check mark, and a blank check box indicates data field that is not selected. Upon selecting at least one data field and triggering 'Anonymize' button 718 on user interface 702, data anonymizing module 508 is instantiated. For example, as explained in reference to FIG. 5, data anonymizing module 508 determines the data fields to be ignored and executes the process of anonymizing on the other related data fields. The execution of the process of anonymization recursively anonymizes business data corresponding to related data fields in all data structures in the data store.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
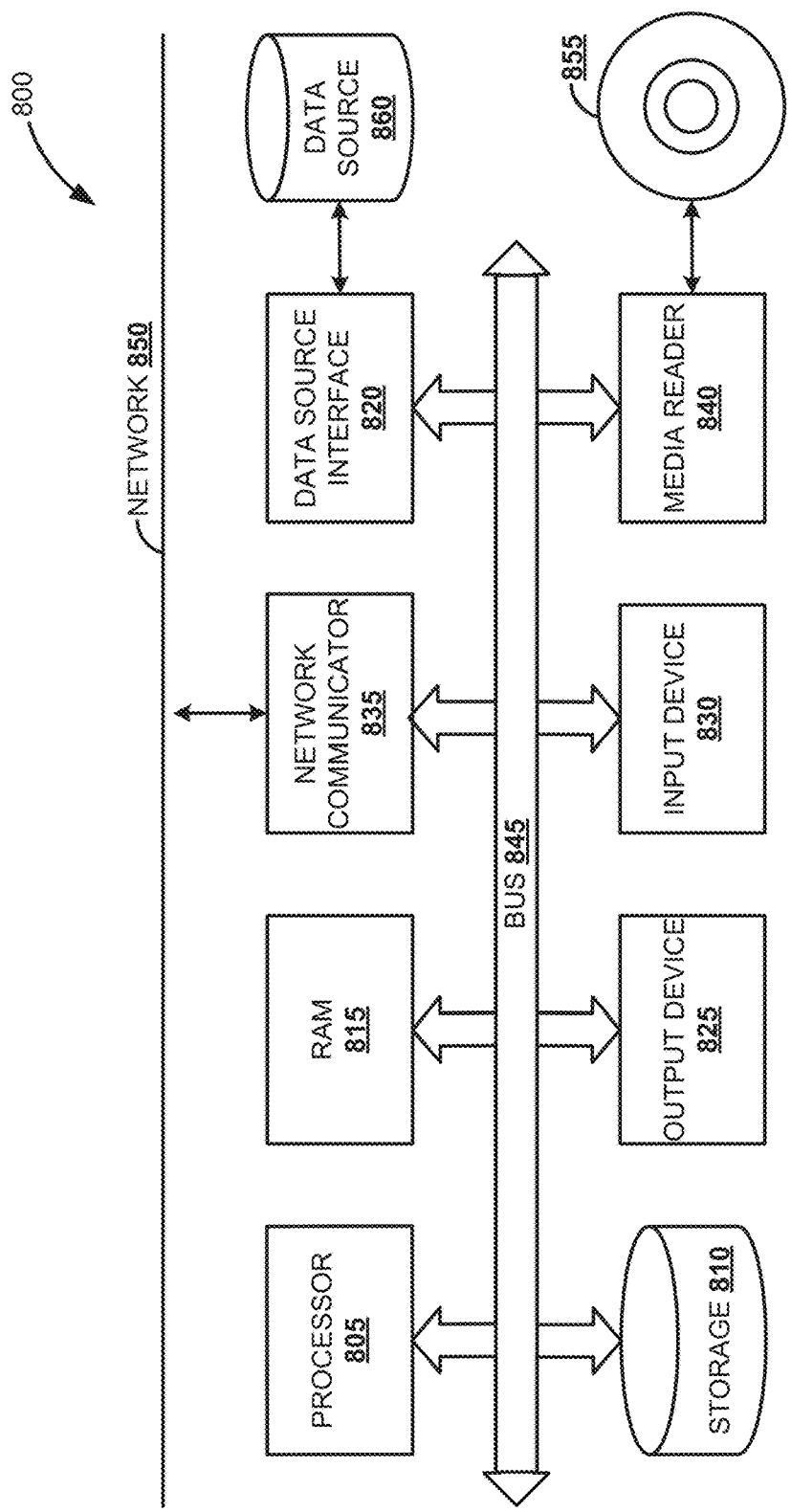
FIG. 8 is a block diagram of an exemplary computer system, according to an embodiment.

FIG. 8 is a block diagram of an exemplary computer system 800, according to an embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A method comprising:
   establishing a connection with a data store storing data structures which each include one or more data fields;
   determining a plurality of data fields within a plurality of respective data structures which are related to each other based on content stored within the plurality of data fields;
   establishing links between the plurality of related data fields within the plurality of respective data structures and storing information about the links within the data store;
   receiving a request to mask a linked data field from among the plurality of linked data fields; and
   in response to the received request, masking content of the linked data field within a data structure including the linked data field and automatically masking content of other linked data fields within other respective data structures respectively including the other linked data fields.

2. The method of claim 1, wherein the request to mask the linked data field is selected via a user interface displaying the data structure including the linked data field.

3. A computer system comprising:
   a data store configured to store data structures which each include one or more data fields; and
   a processor configured to:
      determine a plurality of data fields within a plurality of respective data structures which are related to each other based on content stored within the plurality of data fields;
      establish links between the plurality of related data fields within the plurality of respective data structures and store information about the links within the data store;
      receiving a request to mask a linked data field from among the plurality of linked data fields; and
      in response to the received request, masking content of the linked data field within a data structure including the linked data field and automatically masking content of other linked data fields within other respective data structures respectively including the other linked data fields.

4. The computer system of claim 3, wherein the processor is configured to receive the request to mask the linked data field via a user interface displaying the data structure including the linked data field.

5. The computer system of claim 3, wherein the processor is further configured to generate a unique index corresponding to one or more rows of the data structures identifying one or more of the related data fields linked together.

6. The computer system of claim 3, further comprising an application program interface module configured to generate and output one or more user interfaces associated with data management of the plurality of related data fields.

7. The computer system of claim 3, wherein the processor is further configured to identify a parent data field among the plurality of related data fields based on an amount of overlapping content of the parent data field with other related data fields, and link remaining data fields among the plurality of related data fields to the parent data field.

8. A non-transitory computer readable storage medium to tangibly store instructions, which when executed by a computer, causes the computer to:
   establish a connection with a data store storing data structures which each include one or more data fields;
   determine a plurality of related data fields within a plurality of respective data structures which are related to each other based on content stored within the plurality of data fields;
   establish one or more links between the plurality of related data fields within the plurality of respective data structures and store information about the links within the data store;
   receive a request to mask a linked data field from among the plurality of linked data fields; and
   in response to the received request, mask content of the linked data field within a data structure including the linked data field and automatically mask content of other linked data fields within other respective data structures respectively including the other linked data fields.

9. The article of manufacture of claim 8, wherein the request to mask the linked data field is selected via a user interface displaying the data structure including the linked data field.

10. The method of claim 1, wherein the establishing comprises identifying a parent data field among the plurality of related data fields based on an amount of overlapping content of the parent data field with other related data fields, and linking remaining data fields among the plurality of related data fields to the parent data field based on a hierarchical tree structure.

11. The method of claim 10, wherein the masking comprises masking the parent data field and recursively masking the remaining data fields among the plurality of related data fields based on the hierarchical tree structure.

12. The method of claim 1, wherein the data structures comprise a plurality of database tables, and the plurality of related data fields comprise one or more of a plurality of rows, columns, and cells, respectively included in the plurality of database tables.

\* \* \* \* \*